Figure 1:
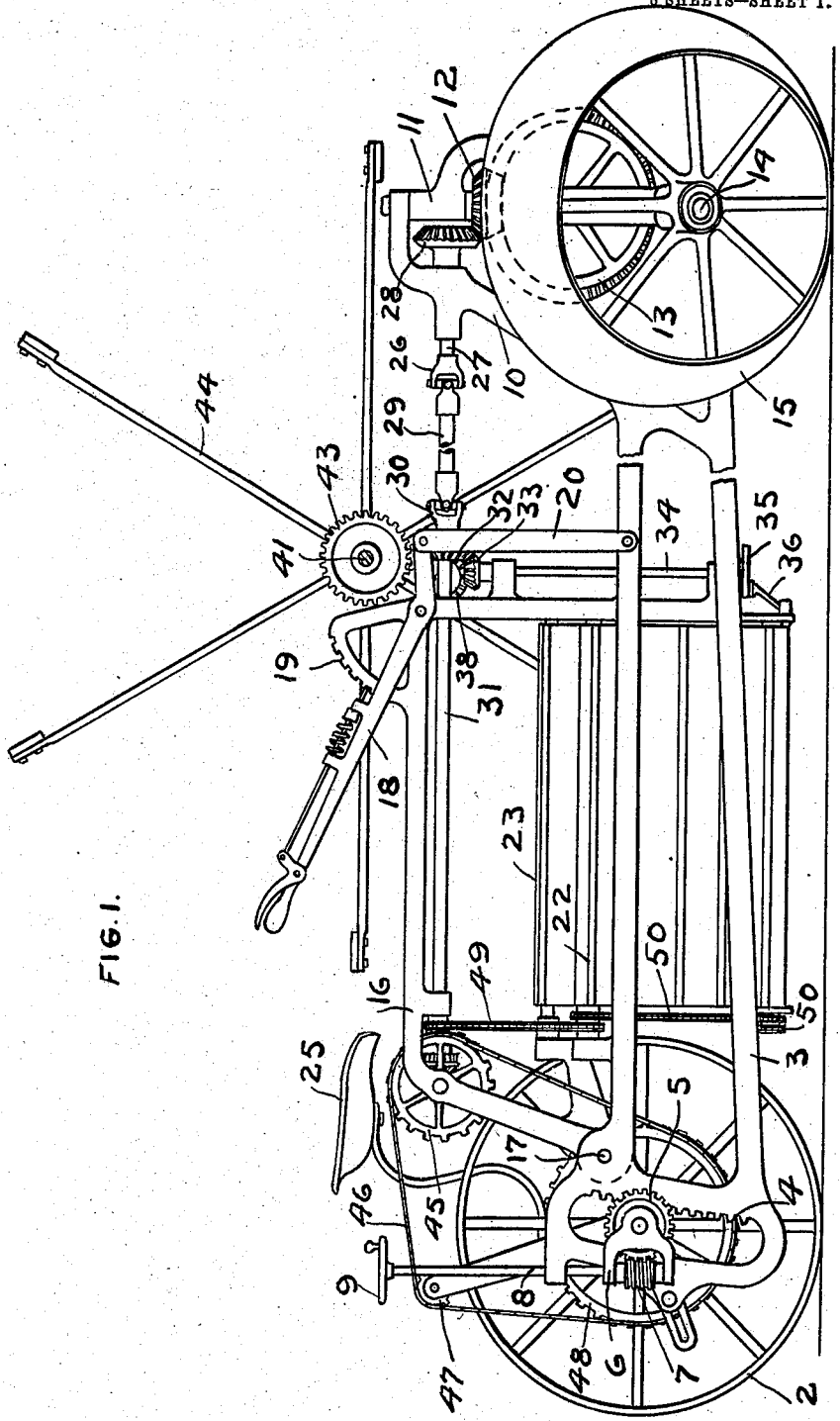

T. E. LIND.
REAPER.
APPLICATION FILED FEB. 5, 1907.

899,878.

Patented Sept. 29, 1908.
3 SHEETS—SHEET 1.

WITNESSES.
J. B. Eva
J. H. Baldwin

INVENTOR
TRUED E. LIND.
BY
ATTORNEYS.

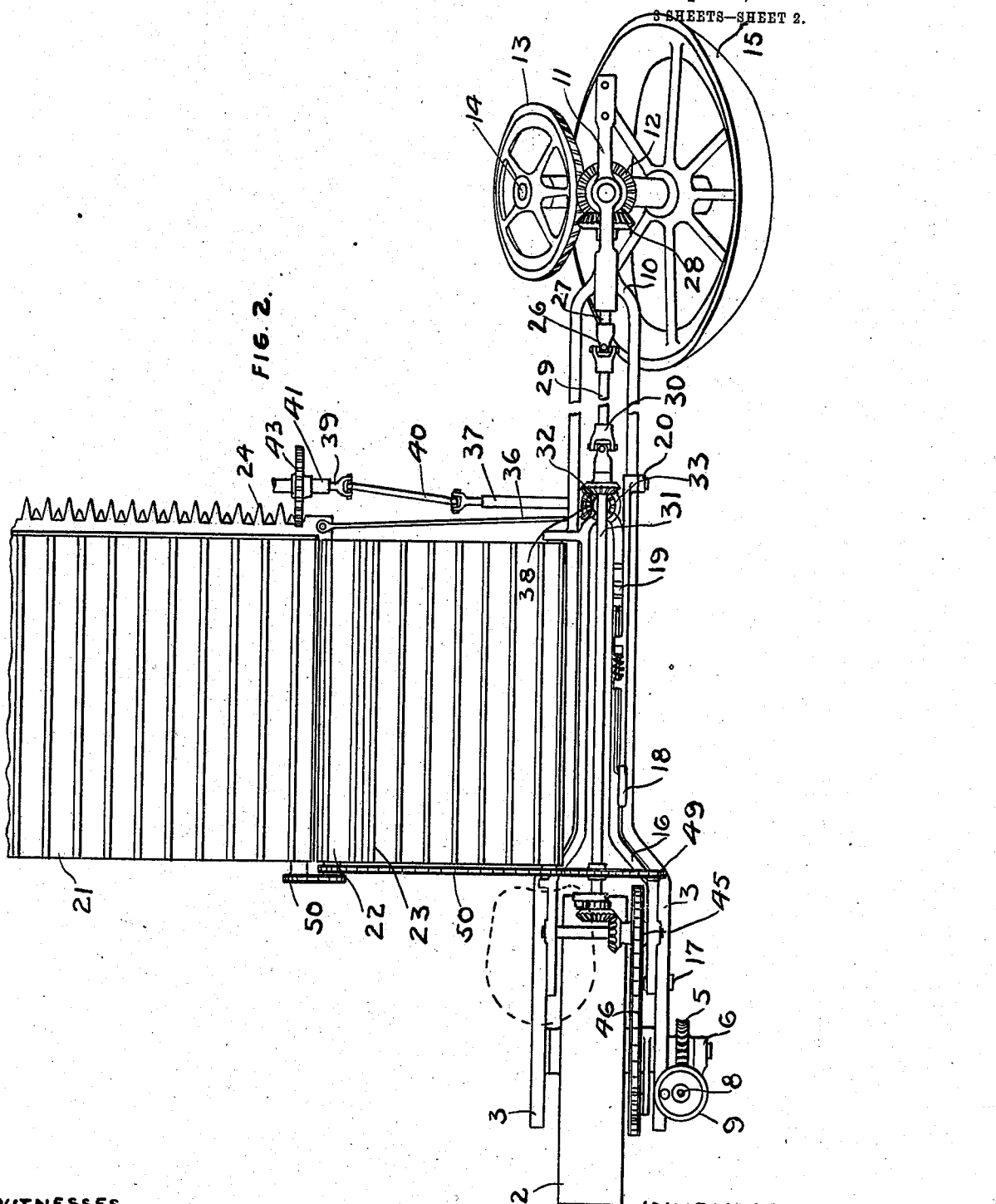

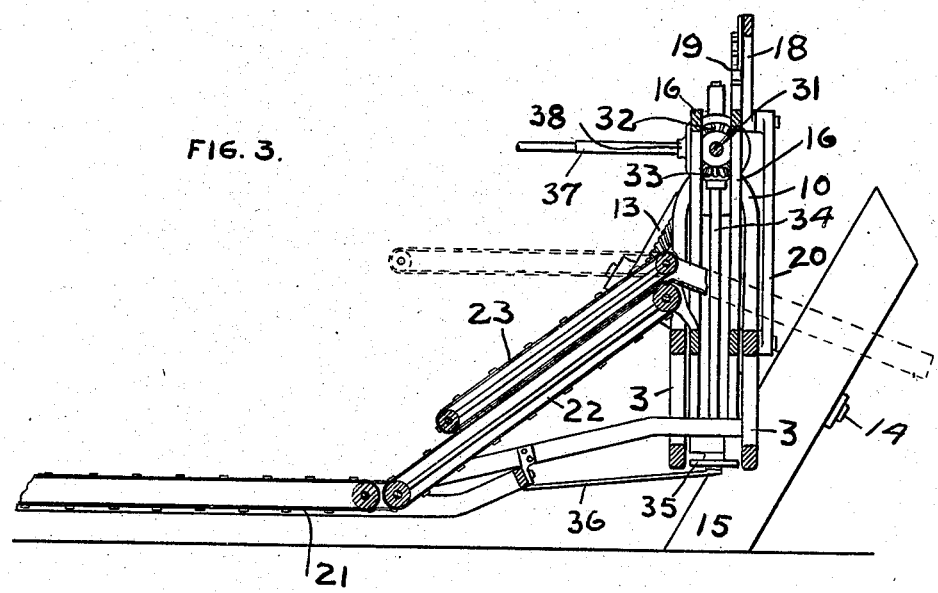
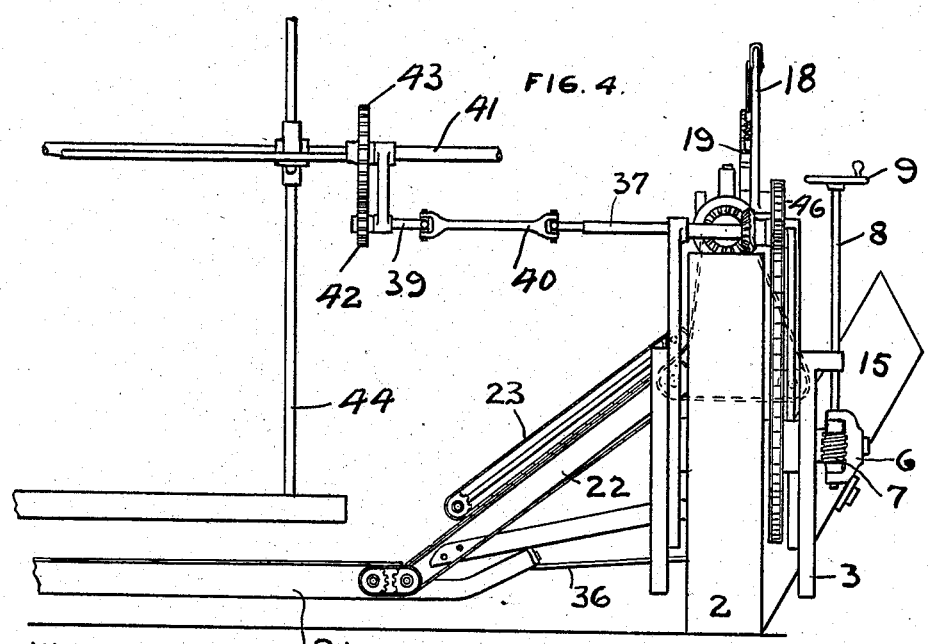

UNITED STATES PATENT OFFICE.

TRUED E. LIND, OF MOOSE JAW, SASKATCHEWAN, CANADA.

REAPER.

No. 899,878.  Specification of Letters Patent.  Patented Sept. 29, 1908.

Application filed February 5, 1907. Serial No. 355,777.

*To all whom it may concern:*

Be it known that I, TRUED E. LIND, citizen of the Dominion of Canada, and resident of Moose Jaw, Province of Saskatchewan, Dominion of Canada, have invented certain new and useful Improvements in Reapers, of which the following is a specification.

The object of my invention is to provide increased traction for a reaper whereby its operation will be more positive and uniform.

A further object is to provide a reaper having means for preventing the operating mechanism from working in toward the land side of the grain.

A further object is to more evenly distribute the load on the traction wheels and to arrange the mechanism so that all parts thereof will be raised out of the dust and dirt and be conveniently accessible for the purpose of oiling, examination or repairs.

My invention consists generally in various constructions and combinations, all as hereinafter described and particularly pointed out in the claims.

In the accompanying drawings, forming part of this specification, Figure 1 is a side elevation of a reaper embodying my invention. Fig. 2 is a plan view of the same. Fig. 3 is a transverse sectional view looking toward the forward end of the machine, and Fig. 4 is a rear elevation.

In the drawing, 2 represents the rear traction wheel and 3 a frame having a rack 4 near its rear end and adapted to be raised or lowered by means of a worm wheel 5, a yoke 6 and a worm 7 on a standard 8 that is provided with an operating wheel 9. This mechanism for raising or lowering the frame 3 corresponds substantially to that in general use on machines of this type and I make no claim to the same herein. The forward portion of the frame 3 has an upwardly extending part 10 that carries a bracket 11 wherein a miter gear 12 is mounted, said gear meshing with a gear wheel 13 that is mounted on the axle 14 that carries also the traction wheel 15. This traction wheel has a beveled or inclined periphery so that it stands at an incline to the ground line and, as indicated plainly in Fig. 3, will resist any inward drawing action of the reaping mechanism and hold it in its proper position with respect to the work. This inclination of the traction wheel also raises the gearing a sufficient distance above the ground to make it easily accessible for the purpose of oiling and to prevent dust and dirt from accumulating therein. This forward traction wheel also serves to keep the mechanism in motion when the machine is turned toward the right and the rear traction wheel is temporarily inoperative. Furthermore, as shown plainly in Fig. 3, the load at the forward portion of the machine is centered directly over the middle of the wheel 7 so that the weight will be evenly distributed and the draft of the machine will be made easier.

A frame 16 is hinged at 17 on the frame 3 near the rear traction wheel and an operating lever 18 is mounted on the forward portion of the frame 16 near a rack 19, and is pivotally connected at one end by a link 20 with the frame 3. This frame 16 supports the grain platform 21, the lower elevator 22 and the upper elevator 23, and also the cutter bar 24. Consequently when the lever 18 is operated, the frame 16 and the mechanism supported thereon, will be raised or lowered according to the height from the ground that the grain is to be cut. A seat 25 is provided near the rear traction wheel convenient to the lever 18 and the hand wheel 9. A knuckle joint 26 is slidably mounted on a shaft 27 that is connected to the gear 12 through a gear 28, and a shaft 29 connects the knuckle joint 26 with a similar joint 30 on a shaft 31, the said knuckle joint permitting the vertical oscillation of the reaping mechanism, the knuckle 26 sliding back and forth on the shaft 27 to adjust itself to the different positions of its connections. The gear 32 is secured on the shaft 31 meshing with a pinion 33 on the upper end of a shaft 34 whose lower end is provided with a crank disk 35 that is connected by a pitman 36 with the cutter bar. A shaft 37 is mounted in the frame 16 and has a gear 38 meshing with the gear 32, and a shaft 39 has a universal joint connection 40 and drives a reel shaft 41 through gears 42 and 43. A reel 44 is mounted on said shaft and operates in the usual way. The rear end of the shaft 31 is geared to a sprocket wheel 45 from which a chain 46 extends from an idler 47 to a wheel 48 on the rear axle. Chains 49 and 50 connect the shaft 31 with the elevators and with the grain platform. The platform and the elevators are thus operated at the desired speed. The upper elevator 23, as indicated in Fig. 3, is capable of swinging vertically on its pivots to allow access to the lower elevator. This I have found to be quite an essential feature of the machine as it frequently happens that access to the lower elevator is desired for the purpose of repairs and as the machines of this kind are ordinarily constructed the upper elevator must be first removed before the lower one can be reached.

In operation, the frame of the machine is adjusted the desired height from the ground and the reaping mechanism is set to leave the desired stubble and as the machine moves along the grain will be deposited upon the platform and moved by the elevating devices to the binder and knotter mechanism, which I have omitted from the drawings as they form no part of my present invention. The forward and rear traction wheels will insure the positive uniform operation of the reaping mechanism at all times, and the arrangement and location of the forward wheel will prevent the machine from working in toward the grain and will keep the mechanism in operation in making a turn. I have also found that the draft of a machine frame constructed in this way will be much lighter than where a single direction wheel is employed and the load is unevenly distributed.

I claim as my invention:—

1. In a reaper, the combination, with a frame, of a traction wheel having a beveled periphery and inclined outwardly with respect to the machine, whereby it will resist the inward movement of the machine toward the work, substantially as described.

2. In a reaper, the combination, with a frame, of a forward traction wheel, having a beveled periphery and outwardly inclined, an upwardly inclined shaft whereon said wheel is mounted, a gear mounted on the inner end of said shaft, a driving shaft operatively connected with said gear, and a reaping mechanism geared to said driving shaft.

3. In a reaper, the combination, with a frame, of a forward traction wheel having a beveled periphery, and outwardly inclined, a shaft whereon said wheel is mounted, a gear mounted on said shaft, a driving shaft operatively connected with said gear, and said driving shaft and gear being located directly above the middle portion of the tread of said wheel, whereby the load will be equally distributed thereon.

In witness whereof, I have hereunto set my hand this 15th day of January 1907.

TRUED E. LIND.

Witnesses:
 RICHARD PAUL,
 J. B. EVA.